US011336927B2

(12) United States Patent
Weegels et al.

(10) Patent No.: US 11,336,927 B2
(45) Date of Patent: May 17, 2022

(54) CONTENT MATCHING SYSTEM

(71) Applicant: REZZONATION B.V., Weert (NL)

(72) Inventors: Sander Anton Martine Weegels, Eindhoven (NL); Henricus Petronella Maria Derckx, Weert (NL); Anthony John Slack, Lorques (FR)

(73) Assignee: REZZONATION B.V., Weert (NL)

( * ) Notice: Subject to any disclaimer, the term of this patent is extended or adjusted under 35 U.S.C. 154(b) by 0 days.

(21) Appl. No.: 16/961,107

(22) PCT Filed: Jan. 8, 2019

(86) PCT No.: PCT/EP2019/050316
§ 371 (c)(1),
(2) Date: Jul. 9, 2020

(87) PCT Pub. No.: WO2019/137897
PCT Pub. Date: Jul. 18, 2019

(65) Prior Publication Data
US 2021/0067815 A1    Mar. 4, 2021

(30) Foreign Application Priority Data
Jan. 10, 2018  (EP) ..................................... 18290006

(51) Int. Cl.
*H04N 21/231* (2011.01)
*H04L 65/612* (2022.01)
*H04L 65/60* (2022.01)
*H04L 65/65* (2022.01)
*H04N 21/234* (2011.01)

(52) U.S. Cl.
CPC ... *H04N 21/23103* (2013.01); *H04L 65/4084* (2013.01); *H04L 65/601* (2013.01); *H04L 65/608* (2013.01); *H04N 21/23418* (2013.01)

(58) Field of Classification Search
CPC . H04L 65/601; H04L 65/608; H04L 65/4084; H04N 21/23103
See application file for complete search history.

(56) References Cited

U.S. PATENT DOCUMENTS

| | | | | |
|---|---|---|---|---|
| 2009/0199007 A1* | 8/2009 | Adams | ............... | H04L 63/0823 713/175 |
| 2010/0042682 A1* | 2/2010 | Kaye | .................. | H04N 21/6125 709/203 |
| 2013/0188932 A1* | 7/2013 | Hartley | ............ | H04N 21/44016 386/282 |
| 2014/0279342 A1* | 9/2014 | Maynard | ................ | G06Q 40/04 705/37 |
| 2015/0113022 A1* | 4/2015 | Martin | .................. | G06F 16/683 707/796 |

(Continued)

OTHER PUBLICATIONS

International Search Report and Written Opinion of the ISA for PCT/EP2019/050316 dated Mar. 14, 2019, 11 pages.

*Primary Examiner* — Minh Chau Nguyen
(74) *Attorney, Agent, or Firm* — Nixon & Vanderhye, P.C.

(57) ABSTRACT

Some embodiments relate to a content matching system (101) comprising a first device (100), a matching server (300), and a second device (200). The content matching system enables the second device to consume content matching with content which is consumable on the first device, even if the first and second devices do not have access to the same streaming service.

17 Claims, 6 Drawing Sheets

(56) References Cited

U.S. PATENT DOCUMENTS

| | | | |
|---|---|---|---|
| 2015/0170325 A1* | 6/2015 | Abecassis | H04N 21/43079 345/2.1 |
| 2017/0111372 A1* | 4/2017 | Jamaa | G06F 16/48 |
| 2018/0192240 A1* | 7/2018 | Liusaari | G06F 3/0484 |
| 2019/0213214 A1* | 7/2019 | Schalkwijk | G10L 25/54 |

* cited by examiner

CONTENT MATCHING SYSTEM

This application is the U.S. national phase of International Application No. PCT/EP2019/050316 filed Jan. 8, 2019 which designated the U.S. and claims priority to EP Patent Application No. 18290006.8 filed Jan. 10, 2018, the entire contents of each of which are hereby incorporated by reference.

FIELD OF THE INVENTION

The invention relates to a content matching system, a first device, a matching server, a second device, a content matching method, and a computer readable medium.

BACKGROUND

Content, such as music or video, is increasingly being consumed through the internet using streaming services. A large number of such streaming is available, and the number seems to be increasing. For example, music may be listened to via online services such as Deezer, Spotify, Apple music, Google music, SoundCloud, YouTube, and the like. Such streaming services provide many advantages. Users have access to much larger collections of content, which are always and everywhere available. Content can be suggested following personal preferences.

There are disadvantages as well though. Sharing of content becomes increasingly harder. For example, using current technology, a user may share content as follows: A User 1 selects content, e.g., a song, video, game, etc., using some content platform on their mobile phone. User 1 clicks on a sharing icon and selects a communication channel, e.g., WhatsApp, mail, sms, etc. A content link is then send to user 2. User 2 receives the message, unlocks his phone and opens the application in which the message was sent by user 1. User 2 clicks on the link which opens the content platform that was used by user 1.

This will only work if user 1 and user 2 happen to be subscribers of the same content platform. For example, if both user 1 and user 2 have a Spotify subscription, then the above sharing will work. However, if user 1 and user 2 do not have a subscription with the same content provider that provides a streaming service, then this will not work. For example, user 2 may instead receive an invitation to join the content platform that user 1 is using. Thus even though both users may have a valid subscription to a streaming service (albeit a different one), the users cannot share content.

SUMMARY OF THE INVENTION

A content matching system is provided as defined in the claims. The content matching system addresses these and other problems. Instead of directly sending a content link from user 1 to user 2, communication goes through a matching server. The matching server finds second content that matches the content that is shared. The second content is available to user 2. This resolves the problem that user 1 and user 2 cannot share content.

The content matching system may identify matching content on the basis of content identifiers, e.g., content links, but may also or instead use content descriptors, e.g., title, information and the like.

In an embodiment, synchronization information is provided so that the users not only share the same content, but can also consume, e.g., listen to or watch, the same content at the same time. For example, the two users could listen to the music at the same time, and share their opinions, e.g., through a messaging app. Note, that even though the user experience is the sharing of content, no media files, such as audio or video files, are transferred from the first device to the second device.

The first device, matching server and second device are electronic devices. The first device and second device may be, in particular, mobile electronic devices, such as a mobile phone, tablet, etc. The first device and/or the second device may be desktop computers.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a content matching system, FIG. 1b schematically shows an example of an embodiment of a memory, FIG. 1c schematically shows an example of an embodiment of a database unit, FIGS. 2a and 2b schematically show an example of an embodiment of content and a pointer, FIG. 3 schematically shows an example of an embodiment of a content matching method, FIG. 4a schematically shows a computer readable medium having a writable part comprising a computer program according to an embodiment, FIG. 4b schematically shows a representation of a processor system according to an embodiment, FIG. 5 schematically shows an example of an embodiment of a content matching system.

Figure 1A:
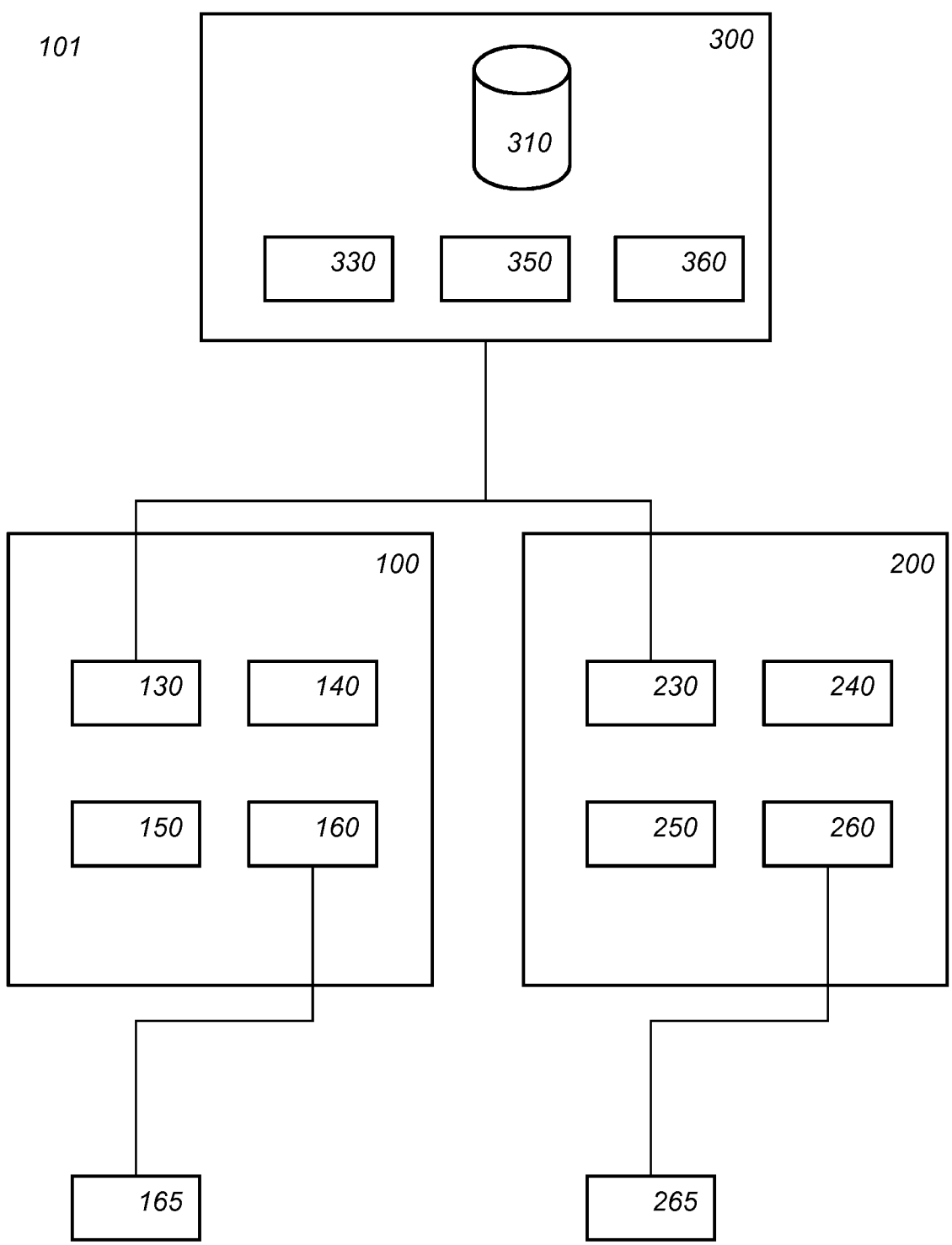

LIST OF REFERENCE NUMERALS IN FIGS.
1a-2b, 4a, 4b 100 a first device
101 a content matching system
130 a communication interface 140 a user interface
150 a first matching unit
160 a first streaming unit
165 a first streaming server
170 a first memory
171 a streaming application
172 a matching application
173 other software
200 a second device
230 a communication interface
240 a user interface
250 a second matching unit
260 a second streaming unit
265 a second streaming server
270 a second memory
271 a streaming application
272 a matching application
273 other software
300 a matching server
310 a matching database
330 a communication interface
350 a server matching unit
360 a database unit
410 a first content
430 a second content
420-422 a pointer
423 a delay
600 a content matching system
610 a first device
615 a first content source
616 a first content information source
620 a second device
625 a second content source
626 a second content information source
630 a matching server
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF PREFERRED
EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a content matching system 101. Content matching system 101 comprises a first device 100, a second device 200 and a matching server 300. For example, first device 100 and second device 200 may be the devices of two users that share content, e.g., a mobile phone, a desktop computer, etc. In an embodiment, first device 100 and second device 200 are both mobile phones.

The various devices of system 101 communicate with each other over a computer network. The computer network may be an internet, an intranet, a LAN, a WLAN, etc. The computer network will typically be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. Combinations are possible, for example, from a first Wi-Fi network to a WAN or the internet and from there to a second Wi-Fi network.

The devices comprise a connection interface which is arranged to communicate with other devices of system 101 as needed. For example, the connection interface may comprise a connector, e.g., a wired connector, e.g., an Ethernet connector, or a wireless connector, e.g., an antenna, e.g., a Wi-Fi, 4G or 5G antenna. For example, first device 100, second device 200 and matching server 300 may comprise communication interfaces 130, 230 and 330 respectively. The computer network may comprise additional elements, which are not separately shown in FIG. 1a, e.g., a router, a hub, etc. The communication interfaces may also be used to communicate with other digital devices, e.g., to communicate with a streaming server. The communication interfaces may be arranged to send and receive digital messages.

The execution of devices 100, 200 and 300 is implemented in a processor circuit, examples of which are shown herein. FIG. 1a shows functional units that may be functional units of the respective processor circuits. For example, FIG. 1a may be used as a blueprint of a possible functional organization of the processor circuits. The processor circuits are not shown separate from the units in FIG. 1a. For example, the functional units shown in FIG. 1a may be implemented wholly or partially in computer instructions that are stored at device 100, 200 or 300, e.g., in an electronic memory of device 100, 200 or 300 and are executable by a microprocessor of the device. In hybrid embodiments, functional units are implemented partially in hardware, e.g., as coprocessors, e.g., audio or crypto coprocessors, and partially in software stored and executed on device 100, 200 or 300.

First device 100 comprises a user interface 140. Second device 200 comprises a user interface 240. For example, the user interfaces may be conventional input interfaces such as a keyboard or a touch screen.

Content matching system 101 enables second device 200 to consume content matching with content which is consumable on first device 100. For example, first device 100 and second device 200 may be a mobile phone on which an appropriate app is installed. In an embodiment, first device 100 runs first software, e.g., an app, to share media, while second device 200 runs second software, e.g., an app, to consume the shared media. The first and second software could be different software, but in practice both the first and second device will run the same software, so that both devices are capable of sharing media and of consuming shared media. Below the sharing is described from the perspective of first device 100, but in an embodiment second device 200 may have the same functionality. Likewise, the consuming of shared media will be described from the perspective of device 200, but device 100 may have the same functionality.

Although device 100 shares media which device 200 may consume, it is important to note that no media is transferred from device 100 to device 200. Instead, each device obtains media from a third party, with which the respective device agreed on a media service.

For example, first device 100 may comprise a first streaming unit 160, and second device 200 may comprise a second streaming unit 260. For example, one or more streaming applications may be installed in a memory of first device 100 and second device 200. The streaming applications implement the streaming units. For example, the first streaming unit 160 may be arranged to connect to a streaming service 165, while the second streaming unit 260 may be arranged to connect to a streaming service 265. There are many commercial streaming services. For example, audio streaming services include companies such as Deezer and Spotify. For example, video streaming services include companies such as Netflix and Videoland.

For example, a streaming unit may be configured to receive an indication of the content from a user of the device, initiate a connection to the streaming service, and receive the first content as a stream from the further streaming service. For example, a streaming unit may send a requesting message comprising an identifier of content to the streaming service to request the content. Alternatively, a user may enter other identifying information, e.g., descriptive information such as any one of a title, an artist, an album, etc. The streaming service may start streaming certain content in response, or may offer a menu of content which satisfies the user request. In the latter case, the streaming application may request the content from the streaming provider through a content identifier, e.g., selected by the user from multiple content identifiers.

For example, the same content identifiers that are used by the native streaming application of first device 100 may be sent to matching server 300 to identify the content to server 300. If the second device has a subscription to the same streaming service, which matching server 300 may for example verify in a database, then server 300 may simply forward the content identifier received from first device 100 to second device 200. But if the second device does not have a subscription to the same streaming service, then server 300 may obtain, e.g., look-up, a new content identifier so that second device 200 can obtain matching content form its streaming service.

First device 100 comprises a first matching unit 150. Second device 200 comprises a second matching unit 250. For example, a matching application may be installed in a memory of first device 100 and second device 200. The matching application implements the matching units. Note that the streaming application and the matching application will typically be distinct applications. For example, the streaming application, e.g., implementing a streaming unit, may be a conventional app as downloaded, e.g., from a provider of streaming services or from an app store, etc. The matching application may interface with the streaming application(s), but is otherwise distinct, and may indeed by downloaded from an independent party. This is an advantage since the matching application can thus work together with a large number of different streaming providers.

Figure 1B:
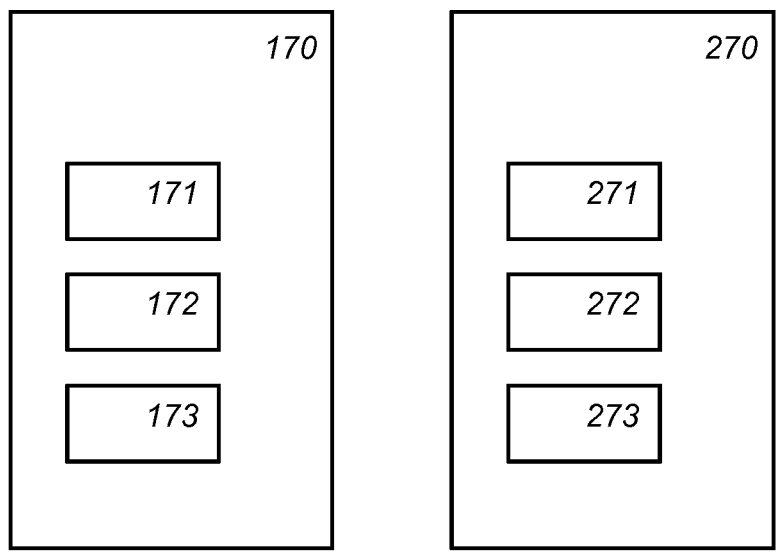

FIG. 1b shows an embodiment of a first memory 170 of first device 100 and a second memory 270 of second device 200. First memory 170 and second memory 270 comprise computer executable programming instructions. For example, first memory 170 and second memory 270 may comprise a streaming application 171, and 271 respectively. For example, first memory 170 and second memory 270 may comprise a matching application 172, and 272 respectively. For example, first memory 170 and second memory 270 may comprise other software 173 and 273, respectively. The streaming application and matching application implement the corresponding streaming unit and matching unit. The streaming applications 171 and 271 need not be the same. The matching applications 172 and 272 need not be the same either, but they may well be.

Returning to FIG. 1a. In this embodiment, both first device 100 and second device 200 are thus capable of streaming media, by streaming it from a streaming service. Note that the first and second streaming service may be different. For example, first device 100 may work with an audio streaming service such as Deezer, while second device 200 may work with an audio streaming service such as Spotify.

First matching unit is configured to share media on first device 100 with second device 200. The sharing may be initiated by receiving a matching signal for a first content.

The first content may be content that the user can consume through the first streaming server 165. For example, the user may listen or watch content in which case the matching unit 150 may use the content that is currently being consumed as the first content. Another option, is that the content is selected by a user of first device 100. For example, the user may select particular content, e.g., from a catalogue of available content, e.g., a folder, a play list, etc., or e.g., from first streaming service 100, and indicate that this content is to be shared. In the latter case, the user does not need to be currently consuming the content.

The matching signal may be a pull or a push signal. In the push scenario, a user of device 100, e.g., through user interface 140 may initiate sharing of content. The matching signal may be a pull signal. In the pull scenario, a user of device 200, e.g., through communication interfaces 230 and 130 request the sharing of content on device 100.

There are thus at least four different scenarios, any of which may be supported by matching units 150 and 250:

I: Push+current content: A user of device 100 instructs matching unit 150 through user interface 140 to share the content that is currently played on device 100, e.g., streamed by streaming unit 160. Matching unit 250 receives a notification of the shared content, and may play it, e.g., stream it from second streaming server 265. The notification may come from matching server 300. Instead of playing it directly, matching unit 250 may receive a signal from its user to play the content later.

II: Pull+current content: A user of device 200 instructs matching unit 250 through user interface 240 to request sharing of the content that is currently played on device 100, e.g., streamed by streaming unit 160. For example, matching unit 250 may send the sharing request to matching unit 150, e.g., through communication interfaces 230 and 130. The sharing request may be routed through matching server 300, but this is not needed. Matching unit 150 may respond by sending a message with identifying information of the current played content. The latter may be routed through matching server 300.

III: Push+non-current content: A user of device 100 selects content, e.g., content that is stored on device 100, e.g., in mp3 format, or content that is playable through streaming unit 160, etc., and instructs matching unit 150 through user interface 140 to share the content that is available on device 100. Matching unit 150 may be configured to share now or at a particular time. There is no need that the user actually consumes the content at the time it is shared. Matching unit 250 receives a notification of the shared content, and may play it, e.g., stream it from second streaming server 265. The notification may come from matching server 300.

IV: Pull+non-current content: A user of device 100 selects content, e.g., content that is stored on device 100, e.g., in mp3 format, or content that is playable through streaming unit 160, etc. At some later time, a user of device 200 instructs matching unit 250 through user interface 240 to request sharing of the content that was selected on device 100. For example, matching unit 250 may send the sharing request to matching unit 150, e.g., through communication interfaces 230 and 130. Matching unit 150 may respond by sending a message with the non-current played content. The latter may be routed through matching server 300. Pull request for non-current content may also be handled by matching server 300. For example, matching unit 150 may send a message to matching server 300 that indicates which content is to be shared if a pull request is received. Matching server 300 can translate the indicated content to the appropriate streaming server of the requesting party.

Matching unit 150 may further be configured to obtain identifying information from the first device for the content to be shared, e.g., the first content. In case of non-current content this may be done in advance, e.g., before the receiving the matching signal. In case of current content, this typically done after receiving the matching signal.

There are various types of identifying information.

A first example of identifying information, is a content identifier of the streaming service. For example, streaming unit 160 may be configured to request content by sending a request messages with a content identifier. Note that the content identifier is typically unique for a streaming service. For example, an audio streaming service like Deezer may refer to a track with a content identifier which is a number, e.g., 4762041. A different streaming service, like Spotify, may refer to the same track with a different content identifier, e.g., an alphanumeric string, e.g., 07q6QTQXyPRCf7GbLakRPrt.

A second example of identifying information is descriptive information such as title, artist, album, beats per minutes, etc.

A third example of identifying information is information that can be obtained from the track itself, e.g., track length, average volume, acoustic fingerprint, etc. For example, an acoustic fingerprint may be computed based on a small sample of the music, e.g., as described in "An industrial-strength audio search algorithm", by Avery Li-Chun Wang.

In an embodiment, the software may make an electronic fingerprint of a content file. Interestingly, such a fingerprint may even be made if the content file cannot be easily read or copied. For example, the fingerprint may be based on retrievable digital parameters, such as file size, format, e.g., all available formats, composition, codecs, etc. The software may be configured to create a unique fingerprint for the particular content file, even without access to the content file itself. A fingerprint based only on meta-parameters, and not on the audio or video data itself, is sometimes referred herein as a digital footprint. A digital footprint gives an option to retrieve the file or save it as a record on the server database, even if the content of the content file itself is not available.

The identifying information may be obtained by matching unit 150 in a number of ways. For example, if the content is available on a streaming service, e.g., in particular if it is currently being played, then the identifying information may be obtained through an interface of streaming unit 160. For example, streaming unit 160 may provide an application programming interface (API) for querying the streaming unit 160 about the content that is available at streaming server 165 or about the content that is currently streamed from streaming server 165. The result of calling the interface may be a content identifier, and/or descriptive information, etc.

Identifying information may be obtained from streaming unit 160 through a sharing function of streaming unit 160. For example, streaming unit 160 may provide a sharing interface, e.g., a button or the like. A user may initiate the sharing interface, e.g., press the button, in response the streaming unit 160 may share identifying information with other applications running on device 100. For example, a track URL may be shared. Although this feature may be intended to share with messaging applications such as WhatsApp or the like, this feature may also be used to share the identifying information with the matching app.

For example, if the content is locally stored, e.g., in a storage of device 100, the identifying information may be obtained from the content itself. For example, the content may comprise tags, such as ID3 tags, from which identifying information may be obtained. For example, the identifying information may be obtained by analyzing the locally stored content or by analyzing the content as it is streamed from the streaming server 165.

The matching unit 150 is further configured to send a first matching message to matching server 300. The matching message comprises an indication of a second device, e.g., of second device 200, and the identifying information. For example, in case of push sharing the user of device 100 may select another device or another user from a contact list of device 100, e.g., of matching unit 150. For example, in case of pull sharing the second device may be obtained from the share request.

Matching server 300 receives the first matching message, e.g., through communication interfaces 130 and 330. Matching server 300 comprises a server matching unit 350 configured to generate a second matching message, e.g., in response to receiving the first matching message. The second matching message comprises an identifier of second content that matches the first content. Matching server 300 may comprise a matching database unit 310 to assist the matching unit 350.

For example, database 310 may comprise identifying information of content available on multiple streaming services. For example, the database may also store the preferred streaming service of devices and/or users of system 101, in particular of second device 200. Upon receiving the first matching message, the matching unit 350 may obtain from the first message the intended recipient, and look-up the preferred streaming service. Next matching unit 350 may search database 310 for matching content that is available on the preferred streaming service. Searching for matching content may also be done independent from receiving matching messages, e.g., independent from device 100 and 200.

For example, if the first matching message comprises a first content identifier of first streaming service 165, then matching unit 350 may look up the first content identifier in database 310 to obtain a second content identifier of the second streaming service 265. For example, database 310 may map first content identifiers, say the numeric identifiers of Deezer, to second content identifiers, say the alphanumeric identifiers of Spotify.

For example, if the first matching message comprises information such as title, artist, album and the like, and/or if the first matching message comprises information such as track length, volume, and audio fingerprints, then matching unit 350 may search for content available on the preferred streaming service of second device 200 that matches the identifying content. Contrary to the situation with a content identifier, this embodiment may use fuzzy matching. For example, a score may be determined for multiple content in database 310, e.g., based on the closeness of track length, content name, and the like. The highest scoring content of the preferred streaming service is selected as matching. For example, matching unit 350 may first select a list of candidate matches, and interact with first device 100, so that a user of first device 100 can select the best match from the list of candidates.

For example, the first matching message may comprise a digital footprint. This is advantageous, e.g., if the content data itself, e.g., audio or video content data, is not available for analysis.

After a match has been selected, a second matching message is generated. The second matching message may comprise an identifier of second content, preferably a content identifier of a second streaming service. The generated second message is sent to second device 200.

Matching unit 250 of second device 200 is configured to receive the second matching message. In response, matching unit 250 may initiate a connection to a streaming service 265, if needed, and send a requesting message comprising the identifier of the second content. Second device 200 then receives the second content as a stream from the second streaming service 265, e.g., to streaming unit 260.

Streaming services 165 and 265 may send a copy of identifying information of the content in their catalogues to build matching database 310. Matching database 310 may also be built by accessing the streaming services 165 and 265. Matching server 300 may comprise a database unit 360. Database unit 360 may be configured to build database 310. In an embodiment, database unit 360 does not run concurrently with receiving the first message request. For example, database unit 360 may build database 310 in the background. On the other hand, database unit 360 may request the required information only after a first matching message is received. In that case, database unit 360 may request the information from the first and second streaming servers 165 and 265 to handle the current request. When a match is found, the match is stored in database 310.

For example, database unit 360 may be configured to be arranged to receive from first streaming service 165 a first multiple of identifying information of multiple content. For example, information may be requested from streaming server 165, e.g., by requesting information for a first range of content id's, or by requesting information for a first set of descriptive information, e.g., a first artist. Database unit 360 may be configured to be arranged to receive from the second streaming service 265 a second multiple of identifying information of multiple content. This information may be requested from streaming server 265, e.g., by requesting information for a second range of content id's, or by requesting information for a second set of descriptive information, e.g., the first artist. The two approaches may be combined. For example, a request to a first service may be for one or more content IDs, whereas the request to the second service is based on the identifying information returned by service 165.

Database unit 360 may store a record for content found of the various content streaming services. In that case, content matching can be done at the time a first matching message is received. On the other hand, database unit 360 may also perform the matching off-line. For example, database unit 360 may be configured to match an identifying information of the first multiple identifying information to an identifying information of the second multiple of identifying information.

Figure 1C:
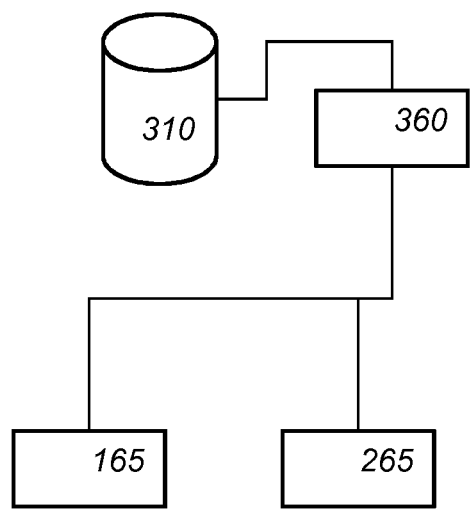

FIG. 1c shows an embodiment of database unit 360. In this architecture, the content matching system 300, in particular database unit 360, is connected to multiple streaming servers, e.g., to streaming servers 165 and 265. These connections are independent from devices 100 and 200. As such the content matching device 300 can scan the multiple streaming servers for content and new content updates. When a new streaming server is added, the content that it offers for streaming can be added to database 310. For example, content matching 300, e.g., database unit 360 may generate and store in database 310 all or much of the content IDs of the multiple streaming servers. For example, the content IDs may be Content ID a unique number or word, referring to, e.g., Content provider: Deezer, Spotify, Videoland, Netflix
Type of content: audio, video
Artist:
Producer:
etc.

In this embodiment, content IDs (so not content itself) from the multiple content providers are stored on our content matching server 300. When connected devices 100 and 200 play or refer to content, then immediately the link and matching is been taken care of on the content matching system. The database 310 might already have matching data available, since the matching function and matching results might run on the system off-line. For example, content matches may be stored in database 310. User profiles, e.g., comprising computer network address of the user devices, e.g., device 100 or 200, and the streaming services that they have access to may also be stored in database 310.

For example, a matching request for a content ID A, may be received at the server 300. In response, database unit 360 may verify if database 310 has a record for content ID A. If not, database unit 360 may request identifying information for content ID A at streaming service 165. Next, database unit 360 may request a content ID B for streaming service 265 by sending the identifying information (or part thereof) to streaming service 265. Streaming service 265 may respond with one or more content IDs B. Database 360 may select a best match, possibly with support from a user of device 100 or 200. The match between content ID A, and content ID B may be recorded in a record of database 310. A second message may be generated containing ID B. For example, ID A may have been contained in a pull or push request for current or non-current content.

Below a possible use case is presented for a user 1 and a user 2. User 1 has the matching app on his mobile device and is playing 'content X' via 'content player X'. User 2 also has the matching app on his mobile device. One or more or all of the following actions may be performed.

1. User 1, e.g., the sender, clicks on a 'share' button in the matching app.
2. A contact list with connected users is shown by the matching app, e.g., on a screen of the mobile device.
3. User 1 select(s) one or more connection(s) and presses 'share', including user 2.

4. A sharing notification is sent to the receivers, e.g., to user 2. The sharing notification may be sent through the matching server, or it may also be sent to the matching server.
5. User 2, e.g., the receiver, gets the sharing notification but does not have the same content provider/player as user 1.
6. The matching server recognizes that content is from a different source, e.g., by checking the content ID.
7. The matching server gathers identifying information of the content selected by user 1 and connects to a database. Identifying information may include one or more of: Name song, Duration of song, Artist, Album, Genre, Release date, BPM (Beat per Minute), Cover visual, Publisher, Etc. Alternatively, the matching server may obtain a content ID which is unique for the content selected by user 1 on the streaming service used by user 1, and use it to identify matching content.
8. When a similar match is found in other content source, this will be streamed and played at device of user 2.
9. In case of a situation where multiple close matches are found in the database, the matching server provides alternatives, e.g., to user 1 or to user 2 to select the preferred option.

The database may store identifying information of multiple streaming services. Alternatively, or in addition the database may be connected via an API to multiple online content sources, e.g., streaming services, and may search for a match via the identifying information of the content send by user 1. There are several ways to organize the database. For example, in an embodiment, the database comprises records that map an identifying information to a content id of a streaming service. For example, the records may map a first content ID to a second content ID. An advantage of this system is that mapping request can be quickly serviced. For example, the database may map Deezer ID's to Spotify ID's, and vice versa. Alternatively, a record of the database contains a content ID of a content that is available at a particular streaming service, together with identifying information. When a request for a content is received, the database is searched for a matching content at an appropriate streaming service. An advantage of the latter architecture is that it is more flexible. Matches can be found even if no perfect match is available or known. It is easy to add additional information to the database, as it becomes available. The two approaches may be combined.

In an embodiment, shared content is started at device 200 from the beginning of the content. For example, a first user may listen to a first track and after sharing, the second user may listen to a corresponding second track, possibly through a different streaming service, from the beginning of the corresponding track. A result of this is that there will be a lag between the playing of the first and second track. For some applications, this is undesirable. For example, the sharing of content, e.g., tracks, may be combined with a messaging service, or by calling, etc. In this case, it may be desirable that both users hear the same or approximately the same music at the same time.

Figure 2A:
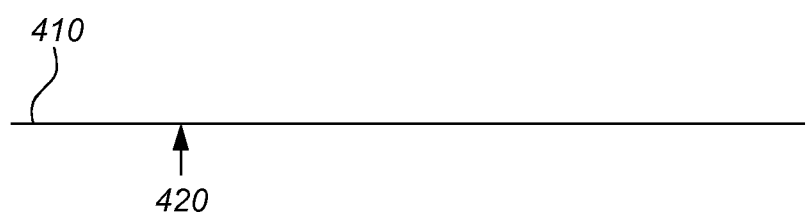
Figure 2B:
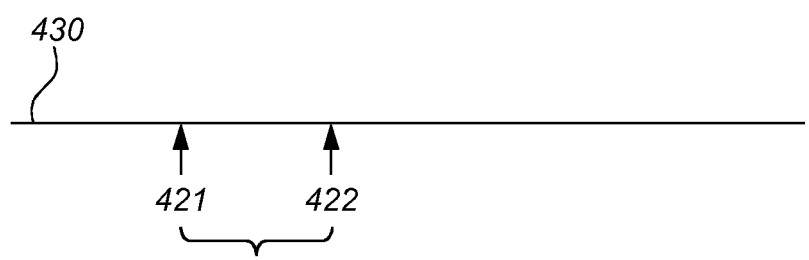

In an embodiment, system 101 may be extended with synchronization. For example, matching unit 150 may be configured to include in the first matching message a pointer indicating a current position in the playing of the first content at the first device. For example, FIG. 2a schematically shows first content 410 as a timeline. In the timelines, time increases from left to right. At point 420, during the playing of content 410 a user of first device 100 decides to share content 410 with second device 200. Matching unit 150 may be configured to include synchronization information in the first matching message. For example, matching unit 150 may indicate a pointer indicating a current position in the playing of the first content at the first device. For example, the pointer may be in time units, e.g., number of seconds into content 410. Using the pointer the second user can start the second content from the point in time when it was shared by the first user.

When only a pointer is used, there may still be an appreciable lag between the playing of the first and second content. It is desirable to further reduce the lag, in particular when the service is combined with message chat, speech or video chat. The synchronizing information may include a timestamp, e.g., indicating the time at which point 420 was reached. For example, the timestamp may be wall-clock time. For example, the timestamp may be in a pre-determined time-zone, e.g., UTC time.

Matching unit 350 is configured to include synchronization information in the second matching message. For example, the synchronization information may include the pointer and a timestamp. The timestamp may be a timestamp included by matching unit 150, e.g., when the point indicated by the pointer was reached. The timestamp may also be an approximation by the matching unit 350. For example, the timestamp may be the time the first matching message was received minus an estimate transfer time from device 100 to device 300.

Matching unit 250 may be configured to use the synchronization information to synchronize the playing. For example, Matching unit 250 may compute a pointer 422 to begin playing in content 430. Note that content 430 may not come from the same streaming server as content 410, but is otherwise expected to match content 410.

For example, in an embodiment the second matching message comprises a pointer 421 and a timestamp of device 100. Matching unit 250 computes the difference between the current time at device 200, and the timestamp, to compute the delay between the transferring to device 200. The delay 423 is added to pointer 421, for example, both may be time units, e.g., in seconds. Playing may then start from point 422. If needed, device 100 and 200 may execute a time synchronization protocol to synchronize the time at device 100 and 200. The second device may perform a sanity check on the timestamp. For example, if the timestamp differs more than a threshold from current time, then the timestamp may be ignored. In this case, just the pointer may be used for synchronizing.

For example, in an embodiment the first matching message comprises a pointer 420. Matching unit 350 estimates the delay caused by sending the message from device 100 to device 200 through device 300. For example, half the round trip time between device 100 and 300 plus the roundtrip time between device 100 and 200, possibly plus a processing time of device 300 may be used as an estimate for the delay. Matching unit 350 can thus compute a pointer at which point matching unit 250 should commence playing. This solution has the advantage that no synchronized clocks are needed, but on the other hand it is expected to be less exact than the above solution.

The devices 100, 200 and 300 may have a user interface, which may include well-known elements such as one or more buttons, a keyboard, display, a touch screen, etc. The user interface may be arranged for accommodating user interaction for performing content streaming, content sharing, adding users, etc.

Storage at device 100, 200 and 300 may be implemented as an electronic memory, say a flash memory, or magnetic memory, say hard disk or the like. The storage may comprise multiple discrete memories together making up the storage. The storage may also be a temporary memory, say a RAM.

Typically, the devices 100, 200 and 300 each comprise a microprocessor (not separately shown in FIG. 1a) which executes appropriate software stored at the devices 100, 200 and 300; for example, that software may have been downloaded and/or stored in a corresponding memory, e.g., a volatile memory such as RAM or a non-volatile memory such as Flash (not separately shown). Alternatively, the devices 100, 200 and 300 may, in whole or in part, be implemented in programmable logic, e.g., as field-programmable gate array (FPGA). Devices 100, 200 and 300 may be implemented, in whole or in part, as a so-called application-specific integrated circuit (ASIC), i.e., an integrated circuit (IC) customized for their particular use. For example, the circuits may be implemented in CMOS, e.g., using a hardware description language such as Verilog, VHDL, etc.

In an embodiment, device 100 may comprise a user interface circuit, a first matching circuit, and a first streaming circuit; device 200 may comprise a user interface circuit, a second matching circuit, a second streaming circuit; device 300 may comprise a server matching circuit, and a database circuit. The devices may comprise additional circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 5:
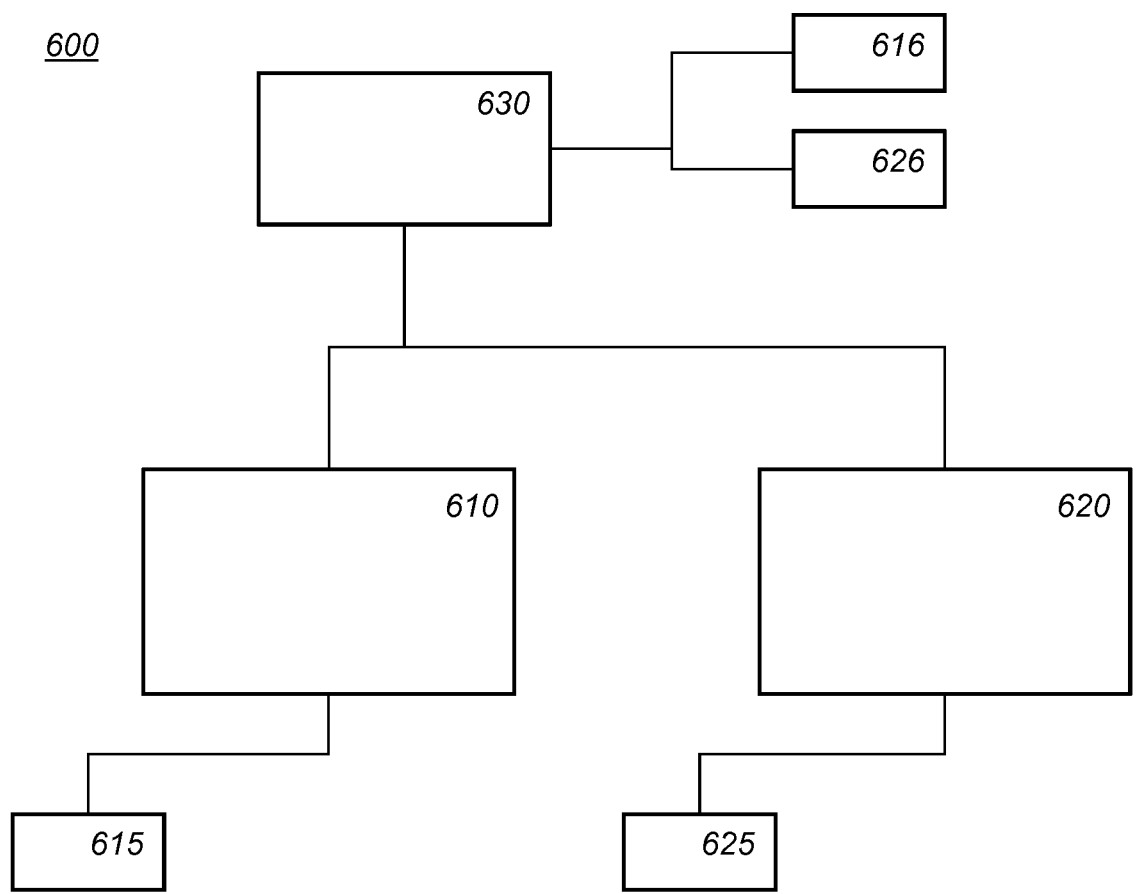

FIG. 5 schematically shows an example of an embodiment of a content matching system 600. A number of examples are described with reference to FIG. 5. The examples may be embodied in isolation. Two or more of the examples may also be embodied in the same embodiment. FIG. 5 discloses a matching server 630, a first device 610 and a second device 620. First device 610 has access to a content source 615. Second device 620 has access to a content source 625. The content sources are configured to provide content, e.g., audio, video, etc., to their respective devices. The content sources may be streaming services. Matching server 630 may have access to content information sources that correspond to the content sources, e.g., to retrieve information such as title, duration, ID on the content source, etc. For example, the content information sources may be implemented as APIs to which the matching server has access. For example, matching server 630 may send content information, such as one or more of title, artist, etc., and retrieve the ID under which corresponding content can be obtained. Matching server 630 may also or instead use a database with information, e.g., on content, e.g., content as provided by content sources 615 and 625. Information sources 616 and 626 are optional. First device 610 and/or second device 620 may be a computer, e.g., smart phone, desktop, tablet, etc. For example, one or more applications, e.g., apps, may be installed on a first device 610 and/or second device 620 to provide the features described herein. Devices 610 and 620 may be configured to send and/or receive control information to/from matching server 630. Server 630 may be implemented in the cloud. Content sources 610 and 620 may be so-called over the top (OTT) content. One or more of the content sources may also be a non-streaming source. For example, a content source may provide static images, pictures, news, text, standard internet pages and other non-streaming examples.

The optional content information sources 616 and 626 may be standard interfaces to a content source. They may be the same, or the same kind, of interfaces as interfaces 615 and 625 used by the user devices, such as devices 610 and 620. In an embodiment, content is provided, e.g., streamed to devices 610 and 620 over the content sources, e.g., content sources 615 and 625, so that the content does not need to pass through server 630. Server 630 may use the content information sources to obtain information from the services on the content, e.g., meta-information, such as track length, track title and the like. In an embodiment, one or more of control data, or sync data, meta-data, match data, and exchange data goes through server 630, whereas the user devices obtain the actual content directly from a content source. In an embodiment, the information source and content source a different type of API; for example, the information source may not allow obtaining of content through it.

Note that in an embodiment, it is in fact possible to have content provided to the user devices through server 630. In that case, only an interface to the content services is needed at server 630 and not at the user devices.

EXAMPLE 1

Content sources 615 and 625 may be the same, e.g., they may be a streaming service, e.g., they may be the Spotify streaming service. Information sources 616 and 626 may be the same and may both point to an information source for the Spotify streaming service. For example, first device 610 may share a single content or a playlist of contents with second device 620, via matching server 630. Second device 620 has playlist freedom, e.g., the second device 620 may allow control over the playing of the shared playlist, e.g., going a content up or down. Second device 620 may control the playing of a song, e.g., fast forward, backward, etc. Synchronization is not needed. Content may be a song, e.g., a Spotify song, or a video, e.g., a YouTube video, etc.

EXAMPLE 2

Content source 625 may be different from content source 615. For example, content source 615 may be Spotify, and content source 625 may be Deezer. Information source 616 may provide information on the Spotify content collection, and information source 626 may provide information on the Deezer content collection. First device 610 may share a single song and/or playlist with device 620 through matching server 630. Matching server 630 matches the content or the contents on the playlist of service 615 with the same or comparable content on service 625. Synchronization is not needed. Second device 620 may have playlist freedom.

EXAMPLE 3

As in Example 1 but with synchronization. Devices 610 and 620 are configured with modes, e.g., private mode, broadcast mode, and tune-in mode. In private mode, a user decides which content to consume. Private mode may allow the sending of receiving of content suggestions, e.g., as in example 1 or 2. Broadcast mode allows sending content suggestions with synchronization. Tune-in mode allows listening to another devices broadcast. Multiple second devices may tune-in to the same first device.

For example, first device 610 may switch to broadcast mode, to broadcast a single content or playlist of contents. Second device 620 may switch to tune-in mode to receive the broadcast. Second device 620, and possible other second devices, may be synch with first device 610. Even though second device 620 may appear to receive content from first device 610, this is not the case. Second device 620 receives content from its content source 625, as controlled by matching server 630. For example, matching server 630 may control the receiving of content of second device 620 from its content source 625 by sending appropriate control signals to device 620 that cause device 620 to start receiving said content form source 625. In an alternative embodiment, the content is obtained by device 620 from matching server 630 who receives it in its turn from a content source. The latter embodiment is not preferred though. By having user devices obtain the content themselves, bandwidth requirements at server 630 are reduced.

First device 610 and/or matching server 630 may send synchronization information. For example, second device 620 may receive a flag, e.g., from matching server 630 that first device 610 changes its mode to broadcast. In response, device 620 may change its mode to tune-in, e.g., tune-in to first device 610.

Interestingly, another device, e.g., a third device (or fourth, fifth, . . . , etc.) may tune to the second device. If the second device itself is tuned to the first device, then the effect may be that the third device obtains the same content as broadcasted by the first device. It is not required that all of the devices that receive the content broadcasted by device 1 are linked to the first device. Instead, devices can obtain broadcasted content through one or more links to the first device. Through such a friend-of-friend network it is possible that multiple devices enjoy the same content. Eventually they make new links, e.g., friends, but this is not necessary. As an example: Device 10 does not even need to know device 1, because the tune-in runs via device 6, say.

For example, in an embodiment, matching server 630 may store a data structure that indicates which device is tuned-in to which device. By following links to a broadcasting device, matching device can determine which content should be played at which device. A corresponding control signal can then be generated and sent to the tuned-in devices.

EXAMPLE 4

As in example 2, but with synchronization. Second devices that use different content sources may consume the same content. Typically, no playlist freedom is provided in tune-in mode, to maintain synchronization. For example, a Deezer user may listen to the same songs, in synchronization, with the Spotify songs that are being broadcasted.

In an embodiment, the second user has the option to go out of sync and, e.g., scroll the playlist up or down to content, e.g., songs that the user wishes to consume. The option to go out-of sync may be a premium option that is only provided to premium users, whereas the option to stay in-sync may be a non-premium option that is provided to non-premium users. This may be enforced by providing a different application to premium users than to non-premium users.

In an embodiment, the broadcasting device, e.g., device 610, may quickly change from a first content to a second content, e.g., before the first content is finished. A tuned-in device that is in-sync can decide to continue obtaining and consuming the first content after the change, and thus go out of sync or continue to stay in-sync and move on to the next content.

Gaming may be done through a separate gaming platform. The user devices may share content, possibly matched and/or synced through matching server 630. The content may be radio or other audio. The content may be overlaid with experience sharing, e.g., text, voice, video, pictures, etc.

EXAMPLE 5

The content source may be a broadcasted content, radio broadcast, e.g., an internet radio broadcast. For example, first device 610 may select a broadcast source 615 and switch to broadcast mode. A second device 620 now has the option to tune-in and start listening to the same content as device 610 is listening to. For example, second device 620 may receive the content from the same broadcast source. In this case, synchronization is automatic. In general, it is possible for a first device 610 to switch to broadcast and allow second devices 620 to consume the same content in synchronization, e.g., as device 610 changes from song to song, or from streaming service to broadcast server, etc., second device 620 may consume the same content, receiving said content either from the same source or from a different source.

EXAMPLE 6

Other content sources are possible, e.g., digital book reading, audio tracks, news audio, text to speech, free streams, television, etc. Synchronization can be provided by matching server 630, or by the content source, e.g., in the case of a broadcast source.

EXAMPLE 7

A content source may be a video content source, e.g., YouTube or Vimeo.

EXAMPLE 8

First device 610 may add content to the content obtained from the content sources 615, 625. The additional content may be locally produced audio and/or video content. The locally produced content may be or may comprise text, voice-over, subtitles, commentary, etc. Synchronization information for synchronizing the additional content to the content from source 610 and/or 620 may be sent to matching server 630. The additional content may also be sent to matching server 630. Second device 620 may receive to original content from its content source 620 and play the content together with the additional content, e.g., as an overlay. The content is typically synchronized with the additional content. The content played on first and second device 610 and 620 may also be synchronized with each other.

For example, first device 610 may receive a song or a video or the like from content source 610. First device 610 may record additional content, e.g., audio and/or video, e.g., related to the original content. For example, a user may sing along with a song, or provide commentary on a video, or act along with a video or the like. Second device 620 may play the sing along, or the commentary or the acting together with the original content obtained from source 620. This may be done in tune-in mode at device 620 and broadcast mode at device 610, or both devices may be in private mode. The overlay may be text, voice, video, picture, audio, and the like. Sharing of additional content may also be done in the other direction. Preferably, the sharing is done in real-time so that they content is experienced by both users at the same time.

An advantage of this example, is that experience sharing is possible. For example, the first and second device may both stream the same Netflix movie, using their respective accounts to do so, through the matching server 630 each may add its commentary which is played in synchronization with the movie at the other device. In this way, two users can share the movie experience while not actually being in the same geographical location at the same time. The sharing may be distributed in time, for example, the second device 620 may play the same movie together with the commentary of first device 610 but at a later time.

EXAMPLE 9

Sharing of additional content can be done with broadcast sources as well. For example, additional content may be shared for television, live events, e.g., sport matches, etc. For broadcast sources the additional content is preferably synchronized with the broadcast content.

EXAMPLE 10

Sharing of additional content for broadcast services may include live recorded additional commentary. For example, during the broadcast content, first device 610 may record video which may be shared to second device 620. For example, a user of first device 610 may be present at a live event which is also broadcasted. First device 610 may record video, picture, or audio, e.g., a so-called selfie, and share the content with second device 620. The additional content is shown in synchronization with the broadcast source, e.g., as an addition window, picture in picture, (partial) overlay, etc. The effect may be that a user may watch a life event on the second device 620, and receive pictures, video and/or audio from friends that are present at the event. The live event may be a sport match, or a music event, or a protest march, etc.

The additional content may be sent directly from the first device to the second device, while only control information is passed through the matching server, e.g., synchronization information, addressing information, etc. In case of a live broadcast, may be automatic, e.g., first device 610 may send the additional content to matching server 630. Matching server 630 may forward the content to all second devices that are registered as wanting to receive the content, e.g., devices in tune-in mode, e.g., tuned-in to the first device 610.

Additional content may come from a variety of sources. Users may use this embodiment to go live on their own. As an example, this could be live event, audio, video, news vloggers. As an example, someone may decide to broadcast a local football match. Someone else may live stream his own cover band. A cafe owner may live-stream in his own pub. Yet someone else may walk across the street and do live interviews at an event or shop.

In yet a further series of examples, one or more of devices 610 and 620 may be configured with a gaming application. For example, devices 610 and 620 may be provided with respective gaming account information. The gaming itself may proceed through respective gaming platforms, while matching server 630 may be used, e.g., to synchronize gaming content. For example, device 620 may watch the gaming of a user on device 610, e.g., by tune-ing in to device 610. For example, devices 610 and 620 may play against each other; footage of which may be provided to yet a further user device. In this case, the footage may be provided from one or more of device 610, 620, etc., to matching server 630 which may provide it to further user devices.

Gaming applications may be combined with any of the options mentioned above. For example, while gaming content may be consumed, such as from a streaming service 615. A second user, may play in the same game, or receive footage of a game, while consuming, e.g., listening to the same content, from content source 625. Additional content may be combined with gaming content, e.g., to provide commentary etc.

Figure 3:
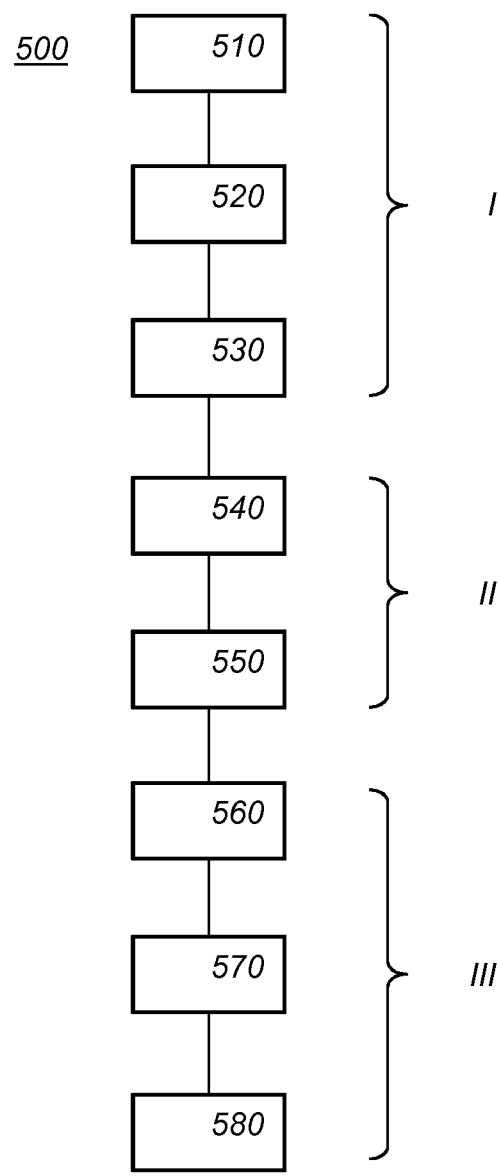

FIG. 3 schematically shows an example of an embodiment of a content matching method 500. Content matching method 500 is for a first device 100, a matching server 300, and a second device 200. The content matching method enables the second device to consume content matching with content which is consumable on the first device. Method 500 comprises receiving (510) a matching signal for a first content,
obtaining (520) identifying information of the first content from the first device, and
sending (530) a first matching message to the matching server, the first matching message comprising an indication of a second device, and the identifying information,
generating (540) a second matching message, the second matching message comprising an identifier of second content, the second content matching the first content, and
sending (550) the second matching message to the second device, and
sending (560) a starting signal to a content streaming application, the starting signal comprising the identifier of the second content,
at least in response to receiving the starting signal, sending (570) a requesting message comprising the identifier of the second content, and
receiving (580) the second content as a stream from the streaming service.

Method 500 may have three stages, marked as I, II and III. The respective stage may be executed at a first device, a matching server, and a second device respectively.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
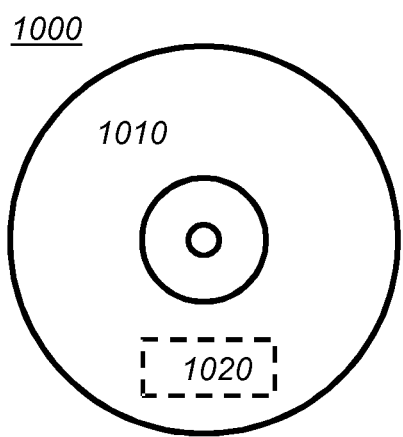

FIG. 4a shows a computer readable medium 1000 having a writable part 1010 comprising one or more computer programs 1020, the computer programs 1020 comprising instructions for causing a processor system to perform a content matching method, according to an embodiment. The computer programs 1020 may be embodied on the computer readable medium 1000 as physical marks or by means of magnetization of the computer readable medium 1000. Computer programs 1020 may have three parts: a computer program for execution at the first device, at the matching server, or at the second device. The computer program for execution at the first device may be the same as the computer program for execution at the second device. For example, the latter may be a downloadable app. For example, the computer programs 1020 may correspond to the parts I, II and III.

However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of content matching or part thereof.

Figure 4B:
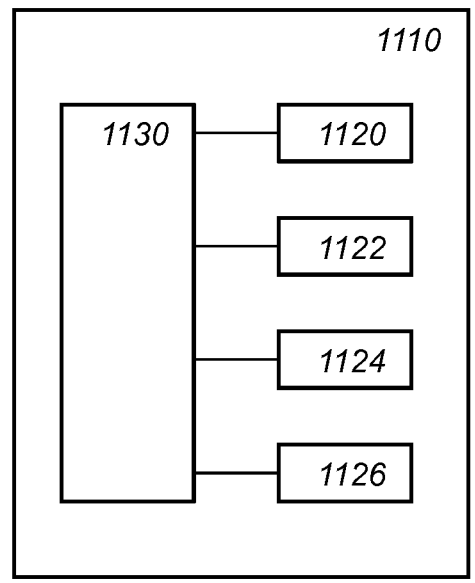

FIG. 4b shows in a schematic representation of a processor system 1140 according to an embodiment. The processor system comprises one or more integrated circuits 1110. The architecture of the one or more integrated circuits 1110 is schematically shown in FIG. 4b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the first device, second device or matching server may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

All product names, trademarks and registered trademarks are property of their respective owners. Use of these names, trademarks and brands does not imply endorsement.

The invention claimed is:

1. A content matching system comprising a first device, a matching server, and a second device, the content matching system enabling the second device to consume content matching with content which is consumable on the first device, wherein
I: the first device comprises a memory and a processor connected to the memory for execution of computer instructions stored in the memory, the memory comprising computer instructions for a matching application,
the matching application being arranged to
receive a matching signal for a first content, during playing of the first content,
obtain identifying information of the first content from the first device, and
send a first matching message to the matching server, the first matching message comprising an indication of a second device, the identifying information, and a pointer indicating a current position in the playing of the first content at the first device,
II: the matching server comprises a memory and a processor connected to the memory for execution of computer instructions stored in the memory, the memory comprising computer instructions arranged to
receive the first matching message from the first device,
generate a second matching message, the second matching message comprising an identifier of second content, the second content matching the first content, the second matching message further comprising synchronization information, and
sending the second matching message to the second device, and III: the second device comprises a memory and a processor connected to the memory for execution of computer instructions stored in the memory, the memory comprising computer instructions for the matching application and for a content streaming application, the matching application being arranged to
receive the second matching message from the matching server, and
send a starting signal to the content streaming application, the starting signal comprising the identifier of the second content, the content streaming application being arranged to
at least in response to receiving the starting signal send a requesting message comprising the identifier of the second content, and
receive the second content as a stream from a streaming service, wherein the matching application is arranged to start playing of the second content on the second device synchronized with the playing of the first content on the first device using the synchronization information.

2. A system as in claim 1, wherein the memory of the first device comprises computer instructions for a further content streaming application, the further content streaming application being arranged to
receive an indication of the first content from a user of the first device,
initiate a connection to a further streaming service, and
receive the first content as a stream from the further streaming service.

3. A system as in claim 2, wherein the streaming service and the further streaming service are different.

4. A system as in claim 2, wherein the further content streaming application is arranged to send a requesting message comprising an identifier of the first content to the first streaming service to request the first content, the identifying information of the first content comprising the identifier of the first content, the matching server being arranged to match the identifier of the first content to the identifier of second content.

5. A system as in claim 2, wherein the matching server comprises a matching database arranged to match the identifying information of the first content to the identifier of second content, the matching server being arranged to build the matching database, the matching server being arranged to
receive from the further streaming service a first multiple of identifying information of multiple content,
receive from the streaming service a second multiple of identifying information of multiple content together with an identifier of the content,
match an identifying information of one or more of the first multiple identifying information to one or more of an identifying information of the second multiple of identifying information
add one or more of records in the database matching said identifying information to the identifier of said matching content.

6. A system as in claim 1, wherein
the first device is arranged to add additional content to the first content, the second device being configured to play the second content together with the additional content, and/or
the second device is arranged to add additional content to the second content, the first device being configured to play the first content together with the additional content.

7. A system as in claim 6, wherein the first device is configured to send synchronization information for synchronizing the additional content to the first content to the matching server.

8. A system as in claim 6, wherein the first device is configured to send the additional content to the matching server or directly to the second device.

9. A system as in claim 1, wherein the identifying information of the first content comprises descriptive information of the first content, the matching server being arranged to match the descriptive information of the first content to the identifier of second content.

10. A system as in claim 1, wherein
the matching application is configured to receive the matching signal from a user of the first device, and/or
the matching application is configured to receive the matching signal from the second device.

11. A system as in claim 1, wherein the matching server comprises a matching database arranged to match the identifying information of the first content to the identifier of second content.

12. A system as in claim 1, wherein
the first and second matching message comprises a timestamp indicating a current time and the pointer indicating a current position in the playing of the first content at the first device, or
the second matching message comprise a further pointer indicating a starting position in the playing of the second content at the second device, said further pointer being obtained by adding an estimated delay to the pointer.

13. A first device for a content matching system comprising the first device, a matching server, and a second device, the content matching system enabling the second device to consume content matching with content which is consumable on the first device, wherein
I: the first device comprises a memory and a processor connected to the memory for execution of computer instructions stored in the memory, the memory comprising computer instructions for a matching application, the matching application being arranged to
receive a matching signal for a first content, during playing of the first content,
obtain identifying information of the first content from the first device, and
send a first matching message to the matching server, the first matching message comprising an indication of a second device, the identifying information, and a pointer indicating a current position in the playing of the first content at the first device.

14. A matching server for a content matching system comprising a first device, the matching server, and a second device, the content matching system enabling the second device to consume content matching with content which is consumable on the first device, wherein
II: the matching server comprises a memory and a processor connected to the memory for execution of computer instructions stored in the memory, the memory comprising computer instructions arranged to
receive a first matching message from the first device, the first matching message comprising an indication of the second device, identifying information identifying first content available at the first device, and a pointer indicating a current position in playing of the first content at the first device, and generate a second matching message, the second matching message comprising an identifier of second content, the second content matching the first content, the second matching message further comprising synchronization information, and sending the second matching message to the second device.

15. A second device for a content matching system comprising a first device, a matching server, and the second device, the content matching system enabling the second device to consume content matching with content which is consumable on the first device, wherein III: the second device comprises a memory and a processor connected to the memory for execution of computer instructions stored in the memory, the memory comprising computer instructions for a matching application and for a content streaming application, the matching application being arranged to receive a second matching message from the matching server, the second matching message comprising an identifier of second content, the second content matching a first content playing on the first device, the second matching message further comprising synchronization information, send a starting signal to the content streaming application, the starting signal comprising the identifier of the second content, the content streaming application being arranged to at least in response to receiving the starting signal send a requesting message comprising the identifier of the second content, and receive the second content as a stream from a streaming service wherein the matching application is arranged to start playing of the second content on the second device synchronized with playing of the first content on the first device using the synchronization information.

16. A content matching method for a first device, a matching server, and a second device, the content matching method enabling the second device to consume content matching with content which is consumable on the first device, the method comprising receiving, at the first device, a matching signal for a first content during playing of the first content, obtaining, at the first device, identifying information of the first content from the first device, and sending, at the first device, a first matching message to the matching server, the first matching message comprising an indication of a second device, the identifying information, and a pointer indicating a current position in the playing of the first content at the first device, generating, at the matching server, a second matching message, the second matching message comprising an identifier of second content, the second content matching the first content, the second matching message further comprising synchronization information, and sending, at the matching server, the second matching message to the second device, and sending, at the second device, a starting signal to a content streaming application, the starting signal comprising the identifier of the second content, at least in response to receiving the starting signal, sending, at the second device, a requesting message comprising the identifier of the second content, and receiving, at the second device, the second content as a stream from a streaming service starting playing, at the second device, of the second content on the second device synchronized with the playing of the first content on the first device using the synchronization information.

17. A computer readable medium comprising non-transitory data representing instructions to cause a processor system to perform at least part of the method according to claim 16.

* * * * *